(12) United States Patent
Usoro et al.

(10) Patent No.: US 7,950,730 B2
(45) Date of Patent: May 31, 2011

(54) FRONT END ASSEMBLIES FOR VEHICLES

(75) Inventors: Idaresit N. Usoro, Ann Arbor, MI (US); Daisuke N. Hirose, Northville, MI (US); Jason Stadtherr, Novi, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 29 days.

(21) Appl. No.: 12/554,452

(22) Filed: Sep. 4, 2009

(65) Prior Publication Data

US 2011/0057480 A1   Mar. 10, 2011

(51) Int. Cl.
*B60J 7/00* (2006.01)

(52) U.S. Cl. .................................................. 296/193.1

(58) Field of Classification Search ............... 296/193.1, 296/180.1; 180/68.1, 68.6; 293/115
See application file for complete search history.

(56) References Cited

U.S. PATENT DOCUMENTS

| | | | | |
|---|---|---|---|---|
| 3,884,516 A | * | 5/1975 | Gallion et al. | 293/120 |
| 4,597,603 A | * | 7/1986 | Trabert | 296/193.1 |
| 4,753,468 A | * | 6/1988 | Szymczak et al. | 293/132 |
| 6,026,768 A | | 2/2000 | Spitler et al. | |
| 6,422,643 B1 | * | 7/2002 | Pease | 296/193.1 |
| 6,508,506 B2 | | 1/2003 | Ozawa et al. | |
| 6,634,702 B1 | | 10/2003 | Pleschke | |
| 6,846,038 B1 | * | 1/2005 | White et al. | 296/193.11 |
| 6,886,872 B2 | * | 5/2005 | Matsumoto et al. | 293/115 |
| 6,945,593 B2 | * | 9/2005 | Andre et al. | 296/187.09 |
| 6,969,097 B2 | * | 11/2005 | Tanaka | 293/115 |
| 7,044,517 B2 | * | 5/2006 | Hyuga | 296/193.1 |
| 7,059,031 B1 | * | 6/2006 | Elwell et al. | 29/401.1 |
| 7,311,352 B2 | * | 12/2007 | Flotzinger | 296/193.1 |
| 7,325,861 B2 | * | 2/2008 | Zacheiss et al. | 296/187.09 |
| 7,354,082 B2 | * | 4/2008 | Sakamoto et al. | 293/115 |
| 7,455,351 B2 | * | 11/2008 | Nakayama et al. | 296/193.1 |
| 7,481,487 B2 | * | 1/2009 | Lau et al. | 296/193.1 |
| D610,043 S | * | 2/2010 | Bauer et al. | D12/92 |
| D627,274 S | * | 11/2010 | Bauer et al. | D12/164 |
| 2006/0108813 A1 | | 5/2006 | Goebert et al. | |
| 2007/0182174 A1 | | 8/2007 | Nakayama et al. | |
| 2007/0216198 A1 | | 9/2007 | Nakamae et al. | |
| 2009/0050385 A1 | | 2/2009 | Guilfoyle et al. | |
| 2009/0261601 A1 | * | 10/2009 | Shin | 293/115 |

* cited by examiner

*Primary Examiner* — Kiran B. Patel
(74) *Attorney, Agent, or Firm* — Dinsmore & Shohl LLP

(57) ABSTRACT

A lower grille assembly for connection with a front bumper structure of a vehicle includes a frame and a covering portion supported by the frame. A lower grille cavity filler extends downwardly beyond the frame. The lower grille cavity filler is sized and arranged to be received within a cavity formed by the front bumper structure and located below the lower grille assembly.

10 Claims, 5 Drawing Sheets

FRONT END ASSEMBLIES FOR VEHICLES

TECHNICAL FIELD

The present specification generally relates to front end assemblies for vehicles and, more specifically, to grille assemblies for vehicles.

BACKGROUND

Radiators are typically used for cooling a vehicle engine by transferring heat from the engine to the atmosphere. The radiators are typically formed of numerous channels through which a coolant, such as a mixture of water and antifreeze, passes. The radiators are often mounted at a front of the vehicle to receive airflow due to forward movement of the vehicle. The airflow picks up the heat from the coolant as the air passes over the channels.

Grille assemblies are frequently used as a covering at the front of a vehicle to protect the radiator and engine of the vehicle while allowing air to pass therethrough for cooling. While it may be important for air to enter the engine compartment through the grille assembly, it may also be important for heated air to exit the engine compartment, for example, to improve engine cooling and air conditioning performance.

SUMMARY

In one embodiment, a vehicle front end assembly includes a bumper structure having a widthwise elongated opening located between an upper bumper portion and a lower bumper portion. A lower grille assembly has a covering portion exposed through the elongated opening of the bumper structure and includes a lower grille cavity filler extending forward into a cavity formed by the lower bumper portion of the bumper structure and located below the lower grille assembly. The lower grille cavity filler partitions a middle section of the cavity from an outer section of the cavity.

In another embodiment, a lower grille assembly for connection with a front bumper structure of a vehicle includes a frame and a covering portion supported by the frame. A lower grille cavity filler extends downwardly beyond the frame. The lower grille cavity filler is sized and arranged to be received within a cavity formed by the front bumper structure and located below the lower grille assembly.

In another embodiment, a method of controlling air flow through a front end assembly of a vehicle is provided. The method includes providing a lower grille assembly for a front bumper structure having a widthwise elongated opening located between an upper bumper portion and a lower bumper portion such that a covering portion of the lower grille assembly is exposed through the elongated opening; and partitioning a middle section of a cavity formed by the lower bumper portion of the front bumper structure by inserting a lower cavity filler forward into the cavity, the lower cavity filler extending from the lower grille assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to front end assemblies of vehicles which generally include grille assemblies including lower grille assemblies. A lower grille cavity filler may be provided that extends into a cavity below the lower grille assembly. This lower grille cavity filler can be used to control flow of heated air through the front end assembly and inhibit flow of the heated air back to a radiator of the vehicle, which can improve performance of, for example, the air conditioning system of the vehicle. Various embodiments of the front end assemblies and the operation of the front end assemblies will be described in more detail herein.

Figure 1:
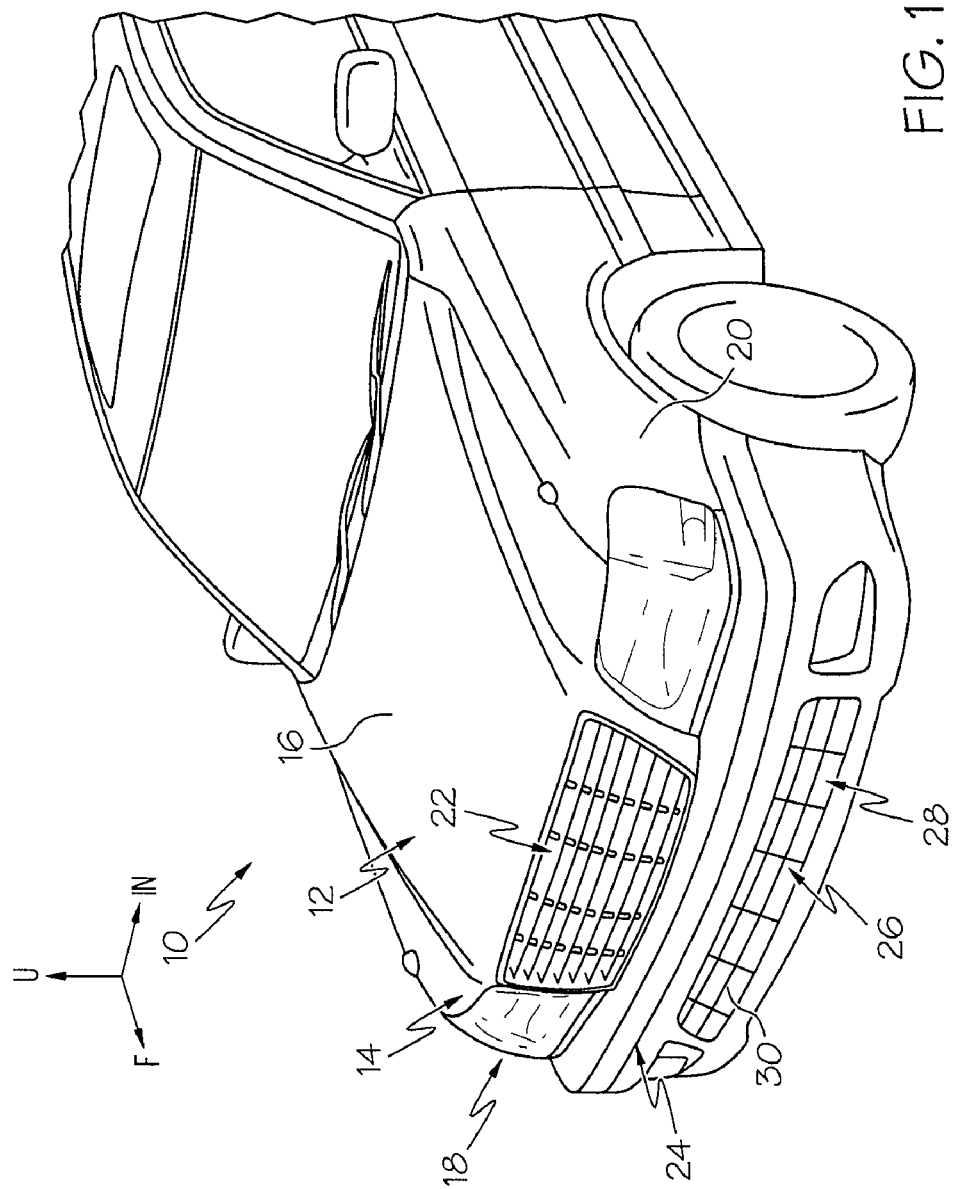
FIG. 1 is a front perspective view of a vehicle according to one or more embodiments shown and described herein.

FIG. 1 generally depicts one embodiment of a motor vehicle 10 where arrows F, U and IN denote forward, upward and widthwise inward directions of the vehicle 10. The vehicle 10 includes a vehicle body 12 having a front end assembly 14 that includes a hood 16, front fenders 18 and 20, an upper grille assembly 22, a front bumper structure 24 and a lower grille assembly 26 that is connected to the front bumper structure 24 and is located between the front fenders 18 and 20. Generally, the lower grille assembly 26 includes a covering portion 28 with a number of horizontally disposed bars 30, a mesh or other suitable covering that protects a radiator behind the covering portion 28, while allowing airflow past the covering and over the radiator.

Figure 2:
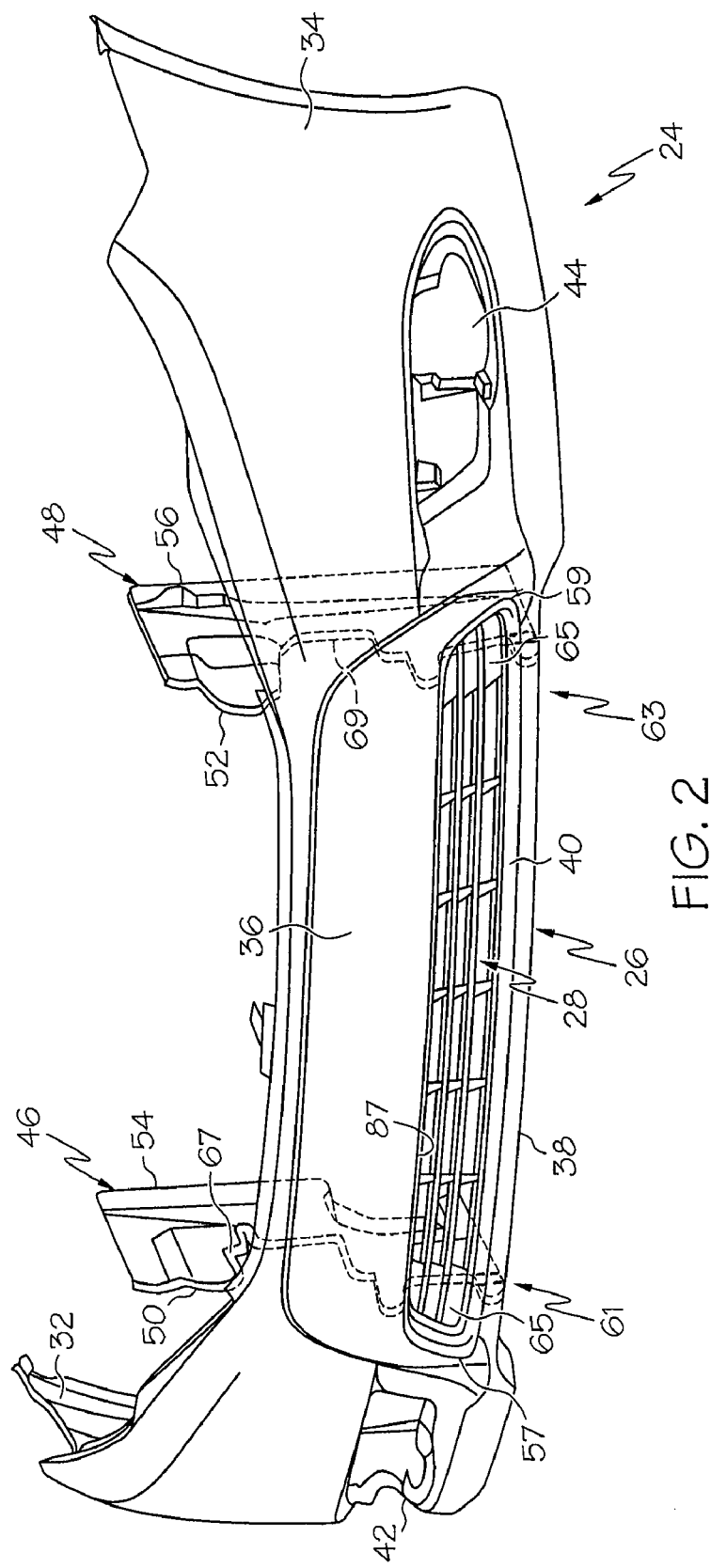
FIG. 2 is a front perspective view of a front bumper structure for use with the vehicle of FIG. 1 according to one or more embodiments shown and described herein.

Referring to FIG. 2, the front bumper structure 24 with lower grille assembly 26 is shown in isolation. The front bumper structure 24 includes a first side 32 that extends rearward toward the passenger side front wheel and a second side 34 that extends rearward toward the driver side front wheel. An upper bumper portion 36 is located above the lower grille assembly 26 that extends in the widthwise direction between the first side 32 and the second side 34. A lower bumper portion 38 is located below the grille assembly 26 that extends in the widthwise direction between the first side 32 and the second side 34. The lower grille assembly 26 is located at an elongated grille opening 40 located between the first and second sides 32 and 34 and between the upper bumper portion 36 and lower bumper portion 38. Openings 42 and 44 are located outward of the lower grille assembly 26 on either side thereof that may be sized and located to receive, for example, lighting systems (e.g., fog lights). The front bumper structure 24 may be formed of any suitable material or combination of materials, such as a polymer material and formed by any suitable process or combination of processes, such as by molding, machining, etc.

A pair of side deflectors 46 and 48 are located behind (or rearward) of the front bumper structure 24. The side deflectors 46 and 48 are connected to the front bumper structure 24 at one side 50 and 52 and extend in a generally rearward direction to an opposite, free side 54 and 56. Side deflector 46 is located nearer side 32 and side deflector 48 is nearer side 34 with the covering portion 28 of the lower grille assembly 26 located therebetween. As can be seen, each side deflector 46 and 48 is located inward of an end edge 57 and 59 of the elongated grille opening 40. Portions 61 and 63 of the lower grille assembly 26 are thus positioned external (or outward) of each side deflector 46 and 48. In some embodiments, the portions 61 and 63 are blocked to prevent air passage through the portions 61 and 63 by rear walls 65. In other embodiments, the portions 61 and 63 may be open to allow air travel therethrough. In some embodiments, the side deflectors 46 and 48 may extend substantially parallel to each other. In other embodiments, the side deflectors 46 and 48 may extend toward each other.

As can be seen in FIG. 2, the side deflectors 46 and 48 may be taller than a height of the lower grille assembly 26 and may also be taller than the front bumper structure 24. In some embodiments, the sides 50 and 52 nearest the front bumper structure 24 have a contour that generally follow an inner contour of the front bumper structure 24. In some embodiments, a sealing member 67 and 69 may be provided along the sides 50 and 52 that is formed of a sealing material (e.g., a rubber or plastic material) that may be softer than the material forming the rest of the side deflectors 46 and 48 (e.g., metal or plastic). The sealing members 67 and 69 may engage an inner surface of the front bumper structure 24 to seal thereagainst and inhibit passage of heated air thereby.

Figure 3:
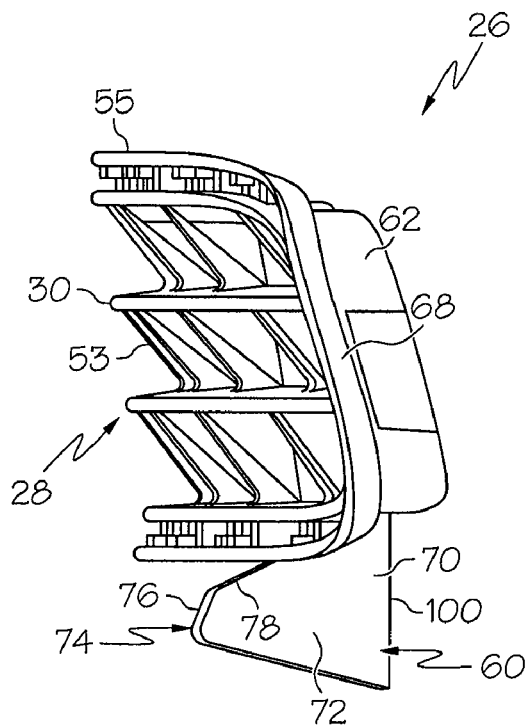
FIG. 3 is a an end view of a lower grille assembly for use with the front bumper structure of FIG. 2 according to one or more embodiments shown and described herein.
Figure 4:
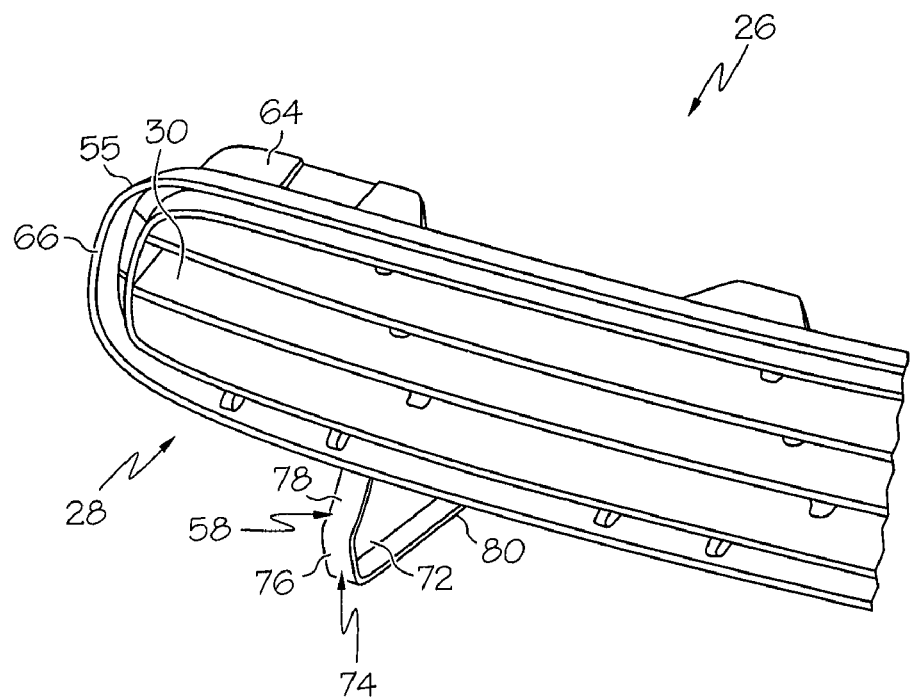
FIG. 4 is a partial, perspective front view of the lower grille assembly of FIG. 3 according to one or more embodiments shown and described herein.

Referring now to FIGS. 3 and 4, portions of the lower grille assembly 26 are illustrated in isolation and generally include the covering portion 28 and lower grille cavity fillers 58 and 60. The profile of the lower grille assembly 26 may generally slant rearward from top to bottom and may include the covering portion 28 with the bars 30 that are supported by a frame 55 that extends about a periphery of the covering portion 28. While the profile of the lower grille assembly 26 is illustrated as slanting rearward, other configurations are possible. For example, the lower grille assembly 26 may be substantially vertical or may slant forward from top to bottom. The bars 30 are also supported by vertical members 53 extending vertically between the bars 30. Additionally, the bars 30 and the frame 55 may have a generally arcuate profile with outer ends of the bars 30 and outer ends 66 and 68 of the frame 55 being located rearward of a center portion of the bars 30 and the frame 55. Support ledges 62 and 64 extend rearward and outwardly from the frame 55 and may extend about a portion of ends 66 and 68 of the frame 55. The support ledges 62 and 64 may also be used to support the bars 30 at their opposite ends.

The lower grille cavity fillers 58 and 60 extend downwardly below and forward beneath the frame 55. The lower grille cavity fillers 58 and 60 may each include a vertical portion 70 and a horizontal portion 72. The vertical portion 70 may extend generally downward below the frame 55 and the horizontal portion 72 may extend generally forward beneath the frame 55 forming somewhat L-shaped lower grille cavity fillers 58 and 60. The horizontal portions 72 of the lower grille cavity fillers 58 and 60 may taper and terminate at a blunt end 74 having a somewhat vertical end surface 76. A rearward slanting surface 78 of the lower grille cavity fillers 58 and 60 may extend upward and rearward and connect to the frame 55. As can best be seen by FIG. 4, an inwardly facing ledge portion 80 may extend about the periphery of each lower grille cavity filler 58 and 60. Each lower grille cavity filler 58 and 60 may have an inwardly facing ledge portion 80 that extends inwardly toward the other inwardly facing ledge portion.

In some embodiments, the lower grille assembly 26 and the lower grille cavity fillers 58 and 60 are formed as a single component with the lower grille cavity fillers 58 and 60 integrally formed with the rest of the lower grille assembly 26. As one example, the lower grille assembly 26 and lower grille cavity fillers 58 and 60 may be formed together in a single (or multiple stage) molding process, for example, of the same plastic material. Forming the lower grille cavity fillers 58 and 60 with the rest of the lower grille assembly 26 rigidly secures the lower grille cavity fillers 58 and 60 with the rest of the lower grille assembly 26.

Figure 5:
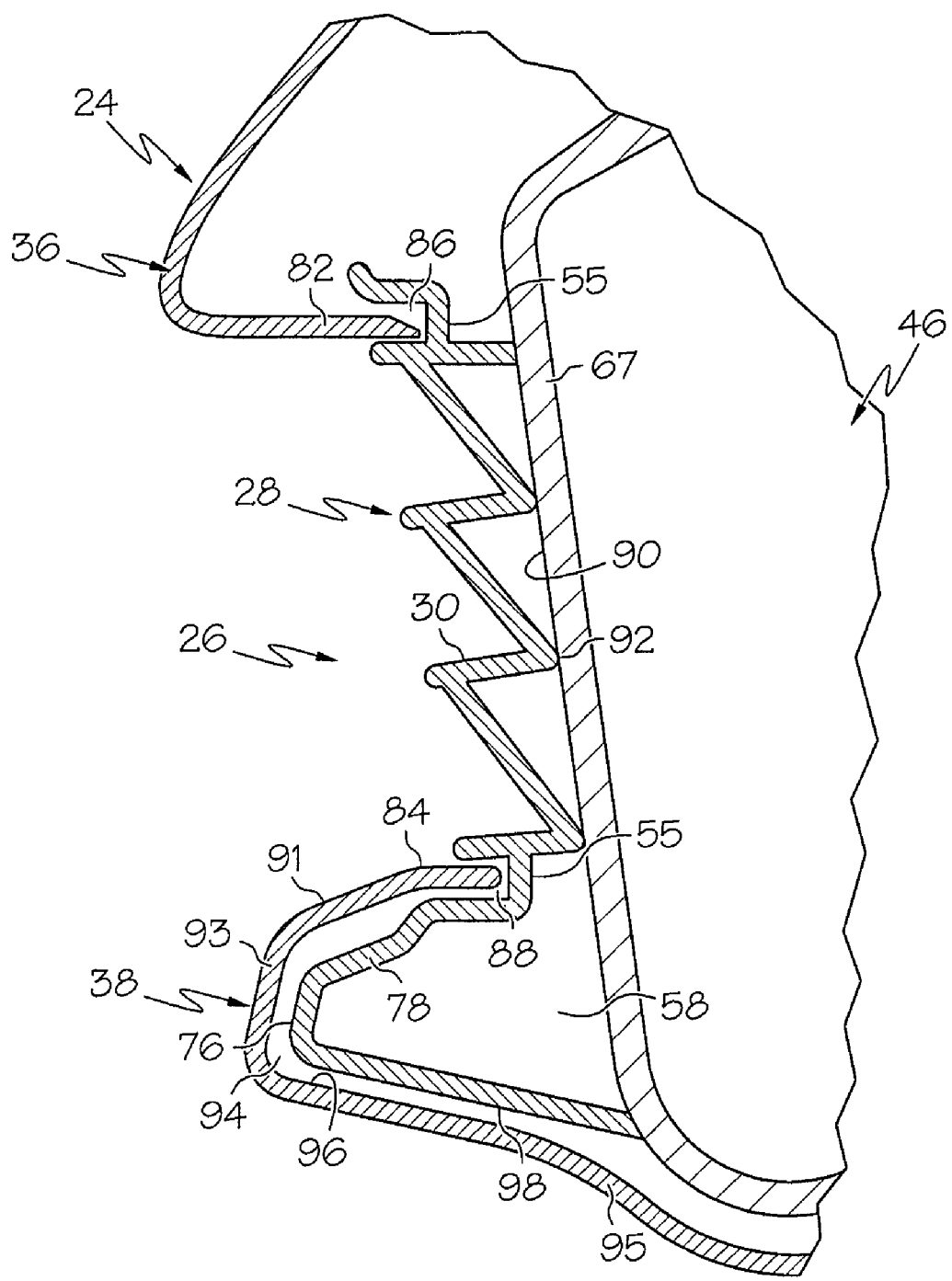
FIG. 5 is a diagrammatic, side section view of the lower grille assembly of FIG. 3 connected to the front bumper structure of FIG. 2 according to one or more embodiments shown and described herein.
Figure 6:
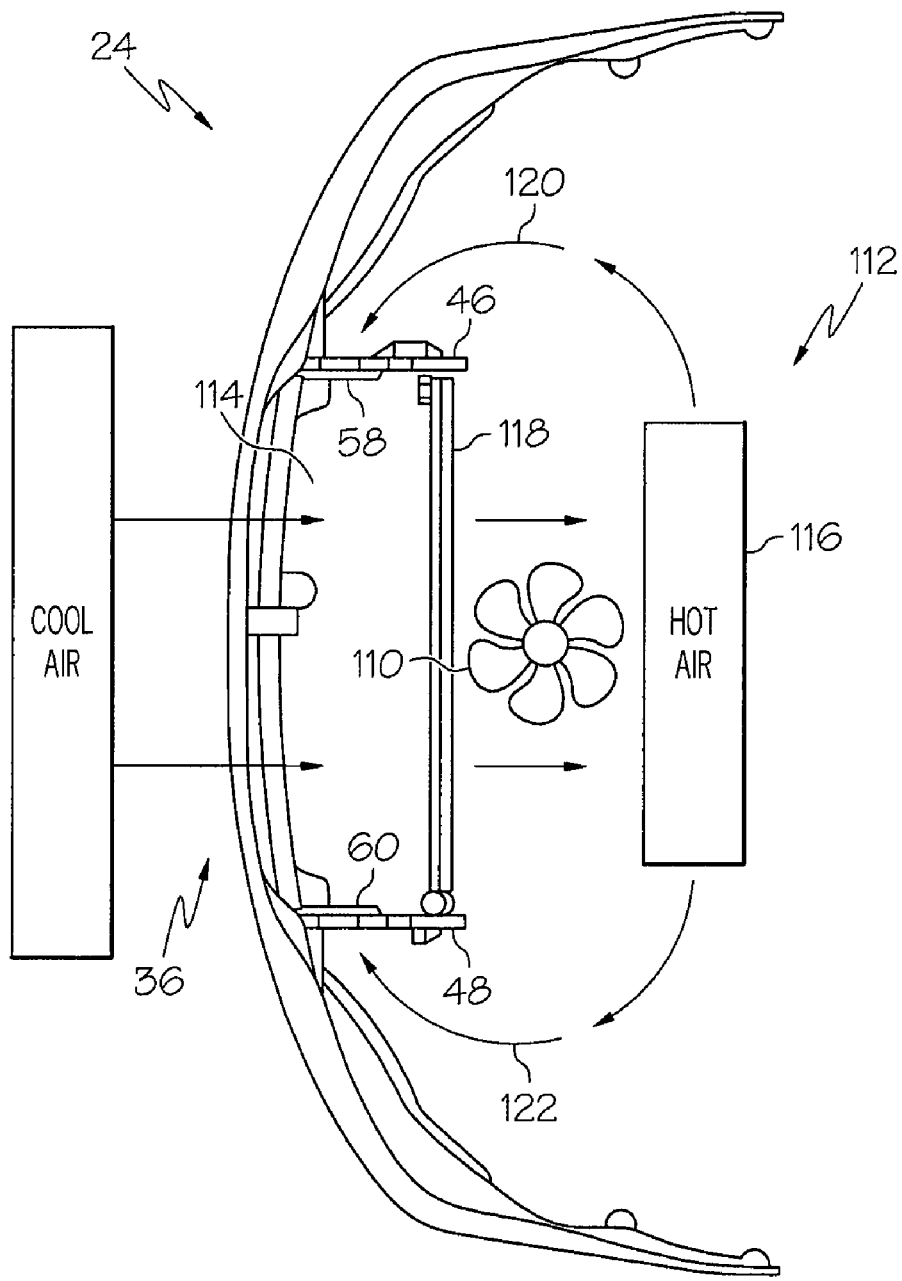
FIG. 6 illustrates operation of the front bumper structure of FIG. 2 with the lower grille assembly of FIG. 3 connected thereto according to one or more embodiments shown and described herein.

Referring to FIG. 5, the front bumper structure 24 is illustrated diagrammatically with the lower grille assembly 26 and side deflectors (only side deflector 46 can be seen) connected thereto. The front bumper structure 24 includes an upper lip 82 and a lower lip 84, each lip 82 and 84 extending rearward toward the engine compartment. The upper lip 82 may be part of the upper bumper portion 36 and the lower lip 84 may be part of the lower bumper portion 38. The upper lip 82 is received in an upper recess 86 of the frame 55 while the lower lip 84 is received within a lower recess 88 of the frame 55. The frame 55 and recesses 86 and 88 are sized and located to receive the front bumper structure 24 and are used to secure the lower grille assembly 26 to the front bumper structure 24.

In some embodiments, a front-facing sealing edge 90 of the side deflectors 46 and 48 (e.g., which may be formed by the sealing members 67 and 69) contacts a rear edge 92 of each bar 30 thereby forming partitioning lines at opposite sides of the covering portion 28. The side deflectors 46 and 48 provide barriers that partition a lower pressure region in front of the radiator from the rest of the engine compartment. Partitioning of the lower pressure region in front of the radiator can facilitate flow of cooler air toward the radiator while reducing recirculation of heated air flowing from the engine compartment, which will be explained in greater detail below.

The lower grille cavity fillers (only lower grille cavity filler 58 can be seen) extend into a cavity 94 in the lower bumper portion 38 below the lower grille assembly 26 thereby partitioning a middle section of the cavity 94 from outer sections of the cavity 94. The cavity 94 is formed by an upper, forward extending wall 91 which includes the upper lip 82, an end wall 93 which extends downward from the forward extending wall 91 and a rearward facing wall 95 that extends rearward from the end wall 93. In some embodiments, the lower bumper portion 38 extends forward and beyond the lower grille assembly 26. The lower grille cavity fillers 58 and 60 have a shape that is similar to a cross-sectional shape of the cavity 94. In some embodiments, one or both of the lower grille cavity fillers 58 and 60 may engage an internal surface 96 of the lower bumper portion 38. For example, any one or more of a bottom surface 98, the end surface 76 and the rearward slanting surface 78 may engage the internal surface 96 of the lower bumper portion 38. In another embodiment, as shown, the lower grille cavity fillers 58 and 60 may be supported in a spaced-apart, hanging relationship to the internal surface 96 of the lower bumper portion 38 where the bottom surface 98, the end surface 76 and the rearward slanting surface 78 are each spaced from the internal surface 96. As can be seen, the lower bumper portion 38 may extend about the lower grille cavity fillers 58 and 60 with the lower grille cavity fillers 58 and 60 located in the cavity 94. In some embodiments, each lower grille cavity filler 58 and 60 is sized and shaped to occupy about 50 percent or more (e.g., such as about 60 percent or more, such as about 70 percent or more, such as about 80 percent or more, such as about 90 percent or more) of a cross-sectional area of the cavity 94 containing the respective lower grille cavity filler 58 and 60.

In some embodiments, as shown by FIG. 5, the side deflectors 46 and 48 extend downwardly alongside the lower grille cavity fillers 58 and 60. The lower grille cavity fillers 58 and 60 may engage the side deflectors 46 and 48. As one example, the front-facing sealing edges 90 of the side deflectors 46 and 48 may engage a rear horizontal surface 100 (FIG. 3) of the lower grille cavity fillers 58 and 60. Engagement between the side deflectors 46, 48 and the lower grille cavity fillers 58 and 60 may inhibit passage of heated air between the side deflectors and their respective lower grille cavity filler 58 and 60. In other embodiments, the side deflectors 46 and 48 may be spaced from the lower grille cavity fillers 58 and 60.

Referring now to FIGS. 3-6, operation of an exemplary front end assembly 14 will be described including the front bumper structure 24 and lower grille assembly 26. An engine cooling fan 110 may draw cooler air into the engine compartment 112 from the surroundings, which may generate a relatively lower pressure region 114 of cooler air in front of the radiator 118 and a relatively higher pressure region 116 of heated air behind the radiator 118. The heated air may escape the engine compartment 112 in a number of ways. One potential escape route for the higher pressure heated air is toward the lower pressure region 114 in front of the radiator 118, as represented by arrows 120 and 122 in FIG. 6. However, referring again to FIG. 5, the side deflectors 46, 48 and the lower grille cavity fillers 58 and 60 cooperate to inhibit passage of the heated air from the higher pressure region 116 to the lower pressure region 114 by partitioning the lower pressure region 114 from the higher pressure region 116. In particular, the lower cavity fillers 58 and 60 extend forward beyond the side deflectors 46, 48 and beneath the covering portion 28 to seal off the center portion of the cavity 94 of the lower bumper portion 38 and to block a possible air passageway provided by the cavity 94 that may lead to the lower pressure region 114 in front of the radiator 118. Locating the lower cavity fillers 58 and 60 adjacent the side deflectors 46 and 48 may provide sealing walls that extend from the top of the bumper structure 24 to the bottom of the cavity 94 of the lower bumper portion 38 that inhibit passage of the heated air from the higher pressure region, past the side deflectors 46, 48 and lower cavity fillers 58, 60, to the lower pressure region. Reducing recirculation of heated air through the radiator 118 may reduce the temperature of the cooler air thereby reducing the temperature of the radiator 118 and improving air conditioner performance.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle front end assembly, comprising:
   a bumper structure having a widthwise elongated grille opening located between an upper bumper portion and a lower bumper portion; and
   a lower grille assembly having a covering portion exposed through the elongated grille opening of the bumper structure and comprising a lower grille cavity filler extending forward into a cavity formed by the lower bumper portion of the bumper structure and located below the lower grille assembly, the lower grille cavity filler partitioning a middle section of the cavity from an outer section of the cavity.

2. The front end assembly of claim 1, wherein the lower bumper portion extends forward—such that the cavity is a forward extending cavity within the bumper structure.

3. The front end assembly of claim 1, wherein the lower grille assembly includes a frame that supports the covering portion, the lower grille cavity filler extending downwardly from the frame.

4. The front end assembly of claim 3, wherein a top of the frame is located forward of a bottom of the frame.

5. The front end assembly of claim 3, wherein the lower grille cavity filler includes a vertical portion extending downwardly from the frame and a horizontal portion extending forward from the vertical portion, the horizontal portion being located in the cavity.

6. The front end assembly of claim 1, wherein the lower grille cavity filler occupies at least 50 percent or more of a cross-sectional area of the cavity containing the lower grille cavity filler.

7. The front end assembly of claim 1, wherein the lower grille cavity filler is formed integrally with the lower grille assembly.

8. The front end assembly of claim 1, wherein the lower grille cavity filler is a first lower grille cavity filler, the lower grille assembly further comprising a second lower grille cavity filler spaced apart widthwise from the first lower grille cavity filler to partition the middle section of the cavity from outer sections of the cavity.

9. The front end assembly of claim 1, wherein the lower grille cavity filler is sized and located to fill a portion of the cavity formed by the lower bumper portion to inhibit passage of heated air thereby toward a low pressure region of cooler air.

10. The front end assembly of claim 1 further comprising a side deflector connected to the bumper structure.

* * * * *